United States Patent
Lee et al.

(10) Patent No.: US 8,989,144 B2
(45) Date of Patent: Mar. 24, 2015

(54) METHOD AND APPARATUS FOR MANAGING WIRELESS NETWORK

(71) Applicant: Electronics and Telecommunications Research Institute, Daejeon (KR)

(72) Inventors: Anseok Lee, Daejeon (KR); Wooram Shin, Daejeon (KR); Hyun-jae Kim, Incheon (KR); Kwang Jae Lim, Daejeon (KR); DongSeung Kwon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 119 days.

(21) Appl. No.: 13/705,281

(22) Filed: Dec. 5, 2012

(65) Prior Publication Data

US 2013/0148595 A1 Jun. 13, 2013

(30) Foreign Application Priority Data

Dec. 7, 2011 (KR) ........................ 10-2011-0130540

(51) Int. Cl.
*H04W 76/02* (2009.01)
*H04W 8/00* (2009.01)
*H04W 84/18* (2009.01)

(52) U.S. Cl.
CPC .............. *H04W 76/02* (2013.01); *H04W 8/005* (2013.01); *H04W 76/023* (2013.01); *H04W 84/18* (2013.01)
USPC .......................................... 370/331; 455/444

(58) Field of Classification Search
USPC .......... 370/331–334; 455/436, 438–441, 443, 455/444
See application file for complete search history.

(56) References Cited

U.S. PATENT DOCUMENTS

| | | | | |
|---|---|---|---|---|
| 6,215,763 B1* | 4/2001 | Doshi et al. | ................... | 370/216 |
| 7,362,974 B2* | 4/2008 | De Patre et al. | ................ | 398/50 |
| 7,630,986 B1* | 12/2009 | Herz et al. | ............................ | 1/1 |
| 8,060,017 B2* | 11/2011 | Schlicht et al. | .............. | 455/41.2 |
| 8,738,010 B2* | 5/2014 | Segall et al. | ................... | 455/442 |
| 2004/0048613 A1* | 3/2004 | Sayers et al. | ................ | 455/426.2 |
| 2005/0270972 A1* | 12/2005 | Kodialam et al. | ............. | 370/216 |
| 2009/0017801 A1* | 1/2009 | Laroia et al. | ................ | 455/414.1 |
| 2009/0252134 A1* | 10/2009 | Schlicht et al. | ................ | 370/338 |
| 2010/0261469 A1* | 10/2010 | Ribeiro et al. | ................ | 455/423 |
| 2010/0296493 A1* | 11/2010 | Lee et al. | ........................ | 370/336 |
| 2011/0019639 A1* | 1/2011 | Karaoguz et al. | ............. | 370/331 |
| 2013/0022022 A1* | 1/2013 | Schmitt | ......................... | 370/331 |

OTHER PUBLICATIONS

Stuart J. Kerry et al., "IEEE Standards 802.11i[TM], IEEE Standard for Information technology-Telecommunications and information exchange between systems-Local and metropolitan area networks-Specific requirements", Part 11: Wireless LAN Medium Access Control (MAC) and Physical Layer(PHY) specifications, Amendment 6: Medium Access Control(MAC) Security Enhancements, IEEE Computer Society, Jul. 23, 2004.

* cited by examiner

Primary Examiner — Kerri Rose
(74) *Attorney, Agent, or Firm* — Rabin & Berdo, P.C.

(57) ABSTRACT

If a target node that enters into a transmission range is sensed, a mesh node of a wireless communication system selects an agent node having itself and a target node as a neighboring node among a plurality of neighboring nodes to form a link with the target node through the agent node. Also, the mesh node deletes the formed link if a target node that is out of a transmission range among a plurality of neighboring nodes is sensed, and forms a substitution path for at least a portion among an entire path of a connection including the deleted link.

20 Claims, 10 Drawing Sheets

METHOD AND APPARATUS FOR MANAGING WIRELESS NETWORK

CROSS-REFERENCE TO RELATED APPLICATION

This application claims priority to and the benefit of Korean Patent Application No. 10-2011-00130540 filed in the Korean Intellectual Property Office on Dec. 7, 2011, the entire contents of which are incorporated herein by reference.

BACKGROUND OF THE INVENTION (a) Field of the Invention

The present invention relates to a method and an apparatus for managing a wireless network. More particularly, the present invention relates to a method and an apparatus for managing a network of a moving wireless mesh network system.

(b) Description of the Related Art

In a wireless cellular network, a terminal performs a handover when a new base station discover a base station witch can provide a link with better channel condition than a serving base station that it is currently connected to is found, that is, a target base station is searched. That is, the terminal is not simultaneously linked to multiple base stations such that the handover is performed to form a link with the target base station and to release a link with the serving base station.

In the wireless cellular network, the target base station must perform the entry and an authentication process with the terminal which performing handover during handover process, and at this time, to support fast handover of the terminal, by receiving terminal information such as identifier, authentication information, and service flow information from the serving base station, a method omitting the connection and the authentication process with the terminal in the handover process is used.

That is, to support the fast handover of the terminal in the cellular network, the serving base station and the target base station are required to be connected reliably through the core network. However, in the wireless mesh network which has mobility, the connectivity among mesh nodes is chaning with time and it is difficult to apply the method for the handover of the wireless cellular network.

In the wireless mesh network, the mesh node may have mobility, and when a new mesh node enters a transmission range, a process of forming the link with the new mesh node is required, while when the neighboring mesh node is moved outside the transmission range, a process to delete the link with the corresponding mesh node is required.

In the link formation process of the wireless mesh network based on a wireless local area network (WLAN), two mesh nodes respectively become an authentication requestor (supplicant) and an authentication licenser (authenticator) through mutual role negotiation to perform the authentication process while following an 802.11i authentication process. The 802.11i authentication process requires communication between the authenticator and the central authentication server, and therefore the link formation time is relatively increased.

Also, when deleting the link with the neighboring mesh node in the wireless mesh network, traffic been delivered through the corresponding mesh node need to be delivered to a different neighboring mesh node and this is determined by a routing table. In the wireless mesh network in the prior art, fixed end-to-end path for data delivery is not used, and therefore path adjustment for the deleted link is not required for this.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a method for managing a network and an apparatus thereof that quickly performs link formation with a new neighboring mesh node and supports restoration of a connection using a path when deleting the link along with a neighboring mesh node. According to an exemplary embodiment of the present invention, a wireless network managing method of a mesh node is provided. A wireless network managing method includes: sensing a target node within a transmission range of the mesh node; selecting an agent node having the target node and the mesh node as neighboring nodes; and forming a link with the target node through the agent node.

The forming may include: transmitting a link formation request message to the target node through the agent node; and receiving a link formation response message for the link formation request message from the target node through the agent node, wherein the link formation response message may include whether the link formation is permitted.

The link formation request message may include information on the mesh node, and the link formation response message includes information on the target node.

The selecting may include: receiving neighboring node information on the neighboring node from the neighboring node; and selecting a neighboring node having the target node among neighboring nodes of the mesh node as the agent node.

The sensing may include recognizing the target node based on quality information on the signal transmitted from the target node or predicted quality information at the target node.

The wireless network managing method may further include: sensing an egress node that is out of the transmission range among a plurality of neighboring nodes forming the link with the mesh node; and deleting the link with the egress node.

The deleting may include setting a substitution path for a connection when the connection including the deleted link exists.

The setting of the substitution path may include changing an entire of end-to-end path of the connection, or a portion of end-to-end path of the connection.

According to another exemplary embodiment of the present invention, a wireless network managing apparatus of a mesh node is provided. The wireless network managing apparatus includes a neighboring node managing unit and a transmitting/receiving unit. The neighboring node managing unit manages a plurality of neighboring nodes positioned inside a transmission range of the mesh node based on a message transmitted from a plurality of neighboring nodes, if a target node newly enters in the transmission range, selects an agent node having the target node and the mesh node as an neighboring node among a plurality of neighboring nodes, and forms a link with the target node through the agent node. A transmitting/receiving unit receives messages from a plurality of neighboring nodes and transmits the messages to the neighboring node managing unit.

The neighboring node managing unit may senses egress node that is out of the transmission range among a plurality of neighboring node, and deletes the link formed with the egress node.

The wireless network managing apparatus may further include a path managing unit managing a connection including the link to each neighboring node and restoring the connection including the link in a case of deleting the link.

The path managing unit may set a substitution path for the connection.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

Throughout this specification and the claims which follow, unless explicitly described to the contrary, the word "comprise" and variations such as "comprises" or "comprising" will be understood to imply the inclusion of stated elements but not the exclusion of any other elements.

Now, a method for managing a network and an apparatus thereof according to an exemplary embodiment of the present invention will be described with reference to accompanying drawings.

Figure 1:
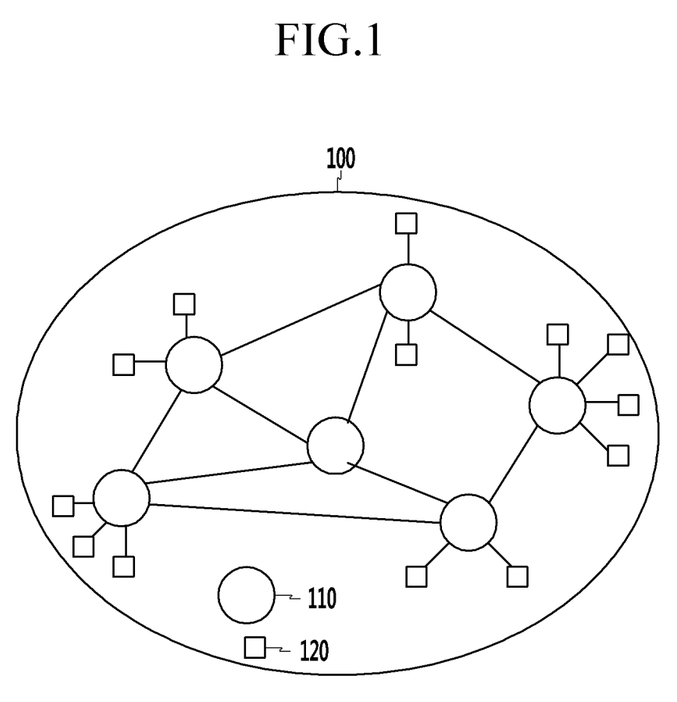
FIG. 1 is a view of a wireless communication system according to an exemplary embodiment of the present invention.

FIG. 1 is a view of a wireless communication system according to an exemplary embodiment of the present invention.

Referring to FIG. 1, a wireless communication system such as a wireless mesh network 100 includes a plurality of mesh nodes 110 and at least one terminal 120 connected at least one of the nodes 110.

Each mesh node 110 is connected to a neighboring mesh node, and permits multiple access rather than 1:1 access with the neighboring mesh node. The mesh node 110 is directly or indirectly connected to the internet, thereby providing an internet service to the terminal 120 connected to the mesh node 110.

The mesh node 110 may form a link with a neighboring mesh node based on a signal transmitted from the neighboring mesh node, and may delete the link formed with the neighboring mesh node. The mesh node 110 sets up a path to transmit data when data to be transmitted is generated, and restores the corresponding connection when the connection using the corresponding link under the link deleting exists to set up an alternative path. The path includes the link between the mesh nodes 110.

Next, a managing method of the network in the mesh node will be described with reference to FIG. 2 to FIG. 9.

Figure 2:
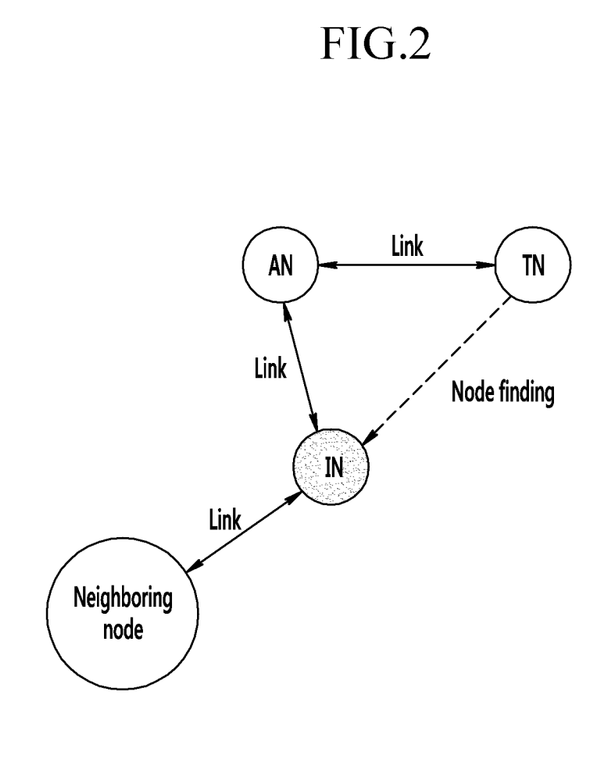
FIG. 2 is a view of one example to explain a link formation method of a mesh node according to an exemplary embodiment of the present invention.
Figure 3:
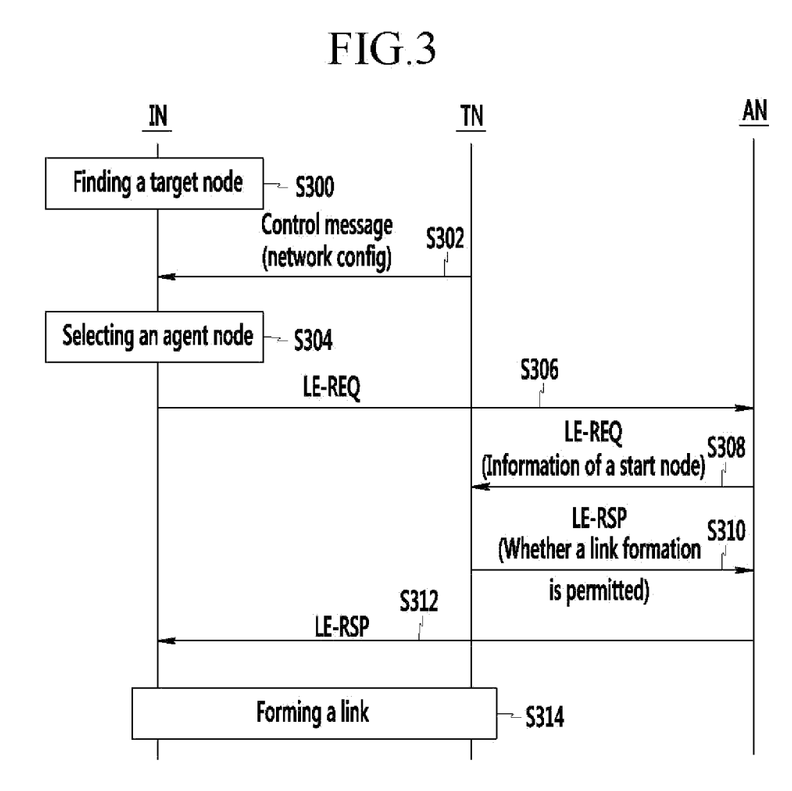
FIG. 3 is a signal flowchart showing the link formation method of FIG. 2.

FIG. 2 is a view of one example to explain a link formation method of a mesh node according to an exemplary embodiment of the present invention, and FIG. 3 is a signal flowchart showing the link formation method of FIG. 2.

Referring to FIG. 2, if a target node TN is detected, an initiating node IN uses one agent node AN having a node IN and the target node TN as a neighboring node instead of a central authentication server to form a link with the target node TN.

In FIG. 2, the initiating node IN senses entry of a new neighboring mesh node and is a mesh node forming the link, the target node TN is a new neighboring mesh node to form the link, and the agent node AN is one mesh node having the initiating node and the target node as neighboring nodes.

When the link with the target node TN meets the triggering condition for the link formation, the initiating node IN starts a process to form the link with the to target node TN.

The triggering condition for forming the link may be defined based a received signal strength indication (RSSI) or a carrier-to-interference noise ratio (CINR) representing signal quality of the target node TN measured in the initiating node IN, and may be defined based on a predictive value of the RSSI or the CINR of a signal at the target node TN predicted by the initiating node IN. Also, the triggering condition to form the link may also be defined by receiving success of a continuous control message from the target node TN.

The RSSI or CINR predictive value may be calculated by using transmission power of initiating node IN and path loss between the initiating node IN and the target node TN. The path loss may be obtained from the RSSI or the CINR of the signal transmitted from the target node TN and the transmission power of the target node TN.

There may be at least one triggering condition for forming the link and each triggering condition may be set to be satisfied by different environments, and when setting a plurality of triggering conditions, a link formation process may be started in a case that the plurality of triggering conditions are all satisfied.

Referring to FIG. 3, if an initiating node IN finds a target node TN to form a link S300, the initiating node IN selects one agent node AN having the target node TN as the neighboring node among the neighboring nodes by using the control message transmitted from the target node TN (S302-S304). In the wireless mesh network, each mesh node transmits the broadcast message to the neighboring node to inform of information of the neighboring node. Accordingly, the initiating node IN confirms the neighboring node of the target node TN from the control message transmitted from the target node TN, thereby selecting the agent node AN. A network configuration message may be used as the broadcast message including the neighboring node information.

The initiating node IN transmits a link formation request message LE-REQ to the agent node AN through the link formed with the agent node AN S306. The link formation request message LE-REQ may include the information of the initiating node IN and an identifier of the target node TN. The information of the initiating node IN as static information of the initiating node IN to execute the communication of two nodes, that is, the initiating node IN and the target node TN, may include, for example, an identifier of the initiating node, capability information, and authentication information.

If the agent node AN receives the link formation request message LE-REQ from the initiating node IN, the link formation request information from the initiating node IN and the information of the initiating node IN are transmitted to the target node TN through the link formation request message LE-REQ S308. The link formation request information is information representing whether the link formation is requested from the initiating node IN.

The target node TN transmits the link formation response message LE-RSP for the link formation request message LE-REQ to the agent node AN S310, and the link formation response message LE-RSP includes information on whether link formation is permitted.

The agent node AN transmits information on whether the link formation is permitted from the target node TN and the information of the target node TN to the initiating node IN through the link formation response message LE-RSP in case of the permission S312. The information of the target node TN as static information of the target node TN to execute the communication of two nodes, that is, the initiating node IN and the target node TN, may include, for example, the identifier of the target node, capability information, and authentication information.

If the agent node AN receives the link formation response LE-RSP from the target node TN, the agent node AN transmit the link formation response LE-RSP to the initiating node IN.

If the information of the target node TN is received, the initiating node IN forms the link with the target node TN by using the information of the target node TN.

Figure 4:
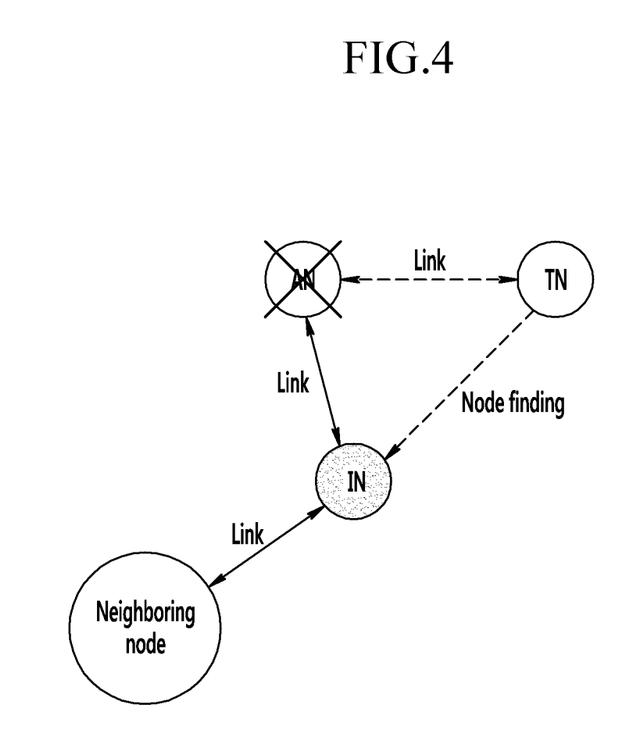
FIG. 4 is a view of another example to explain a link formation method of a mesh node according to an exemplary embodiment of the present invention.
Figure 5:
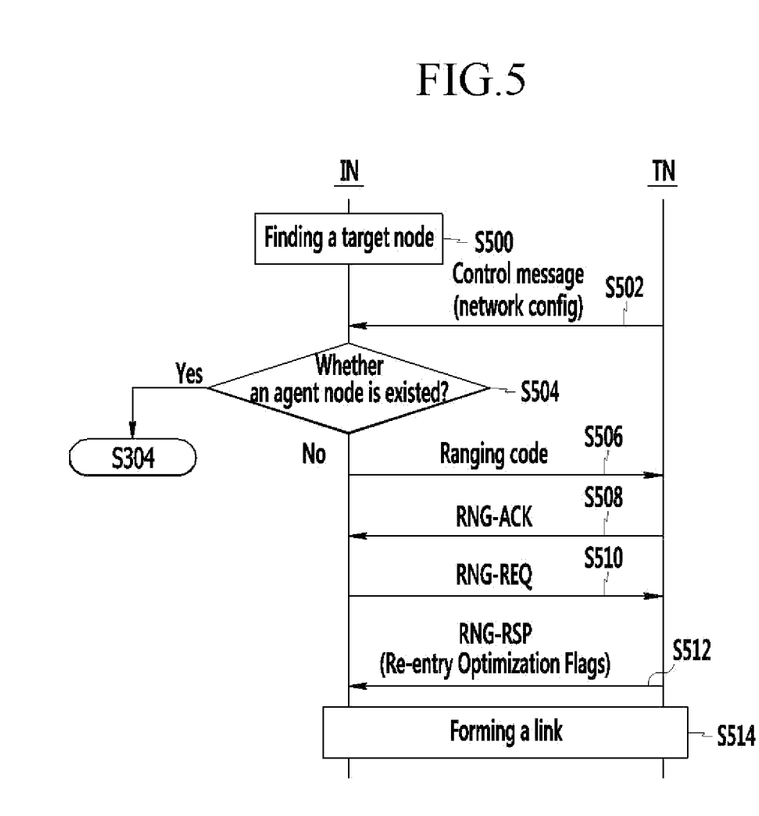
FIG. 5 is a signal flowchart showing the link formation method of FIG. 4.

FIG. 4 is a view of another example to explain a link formation method of a mesh node according to an exemplary embodiment of the present invention, and FIG. 5 is a signal flowchart showing the link formation method of FIG. 4.

Referring to FIG. 4, if a target node TN is found, the initiating node IN selects one agent node AN having a node IN and the target node TN as neighboring nodes, however the agent node AN having the node IN and the target node TN as the neighboring nodes may not exist. In this case, the initiating node IN may not transmit a message by using a control channel or a data channel because the link formed with the target node TN does not exist. Accordingly, the initiating node IN forms the link through a direct connection such as an initial network entering process.

Referring to FIG. 5, if the target node TN is found S500, the initiating node IN selects the agent node AN having the target node TN as the neighboring node among the neighboring nodes of the corresponding node IN by using the broadcast message transmitted from the target node TN. At this time, if the agent node AN having the target node TN as the neighboring node among the neighboring nodes of the node IN does not exist (502-S504), the initiating node IN transmits a ranging code with which the target node TN identifies the initiating node IN to the target node TN to attempt an initial ranging S506.

If the target node TN receives the ranging code from the initiating node IN, the ranging response message RNG-ACK for the initial ranging is transmitted to the initiating node IN S508. The ranging response message includes a transmission resource for the message transmission.

The initiating node IN allocates the transmission resource for the message transmission from the target node TN through the ranging response message RNG-ACK, and the ranging request message RNG-REQ for the message-based ranging is transmitted to the target node TN through the allocated transmission resource S510. The ranging request message may include a reentering request of the initiating node IN.

The target node TN transmits the ranging response message RNG-REQ for the ranging request message RNG-REQ to the initiating node IN S512. A re-entry optimization flag for optimization of the link formation process may be set in the ranging response message RNG-REQ, and the re-entry optimization flag may include information on whether re-authentication or registration is omitted.

For example, when the authentication between the links is required, the re-authentication is performed through a privacy key management (PKM) message exchange, and the initiating node is previously registered to the network for the allocation of the identifier, thereby the registration may be omitted.

The initiating node IN performs the re-authentication process and/or the registration process according to the re-entry optimization flag of the ranging response message RNG-REQ to form the link S514.

Figure 6:
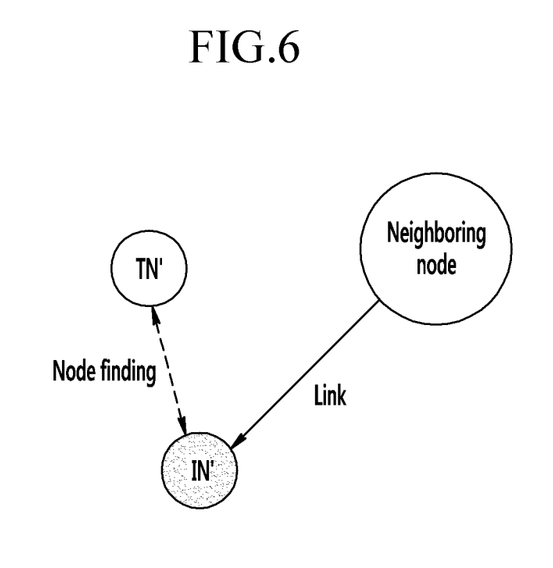
FIG. 6 is a view of one example to explain a link deleting method of a mesh node according to an exemplary embodiment of the present invention.
Figure 7:
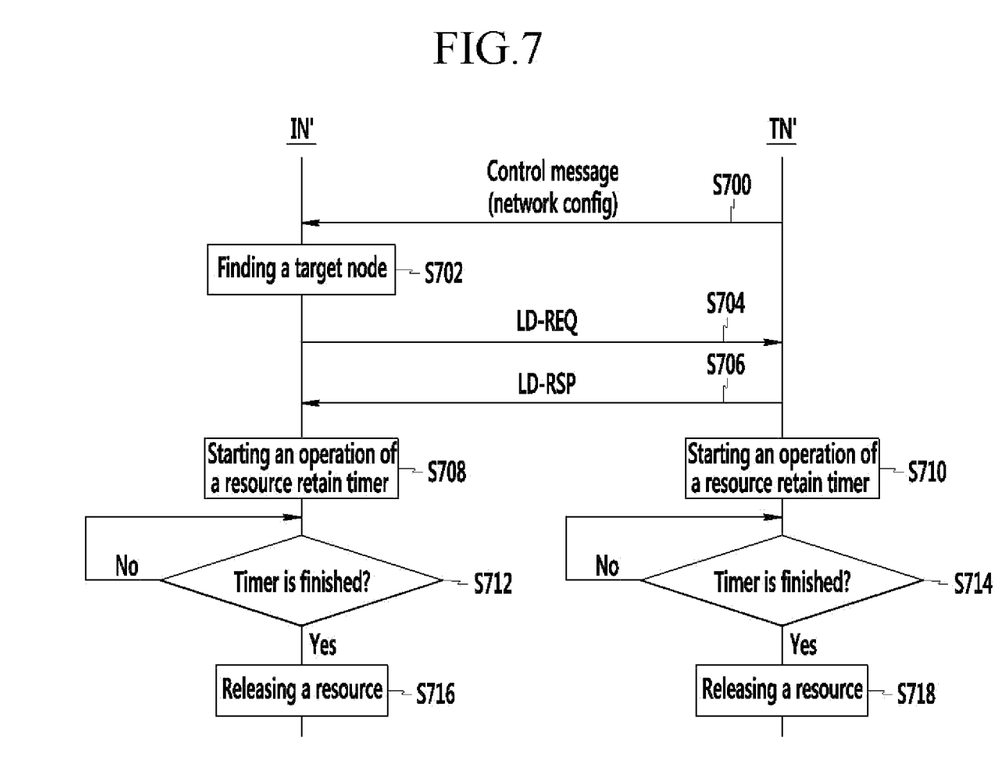
FIG. 7 is a signal flowchart of the link deleting method of FIG. 6.

FIG. 6 is a view of one example to explain a link deleting method of a mesh node according to an exemplary embodiment of the present invention, and FIG. 7 is a signal flowchart of the link deleting method of FIG. 6.

Referring to FIG. 6, if the target node TN' to delete the link is found, the initiating node IN' performs the process to delete the target node TN' and the link.

In FIG. 6, the initiating node IN' is the mesh node to delete the link formed with the neighboring mesh node that is out of transmission range, and the target node TN' is the neighboring mesh node as a link for deleting the target node.

The initiating node IN' starts process to delete the target node TN' and the link with the target node TN' when satisfying the triggering condition for the link deleting.

The triggering condition for the link deleting may be defined based the RSSI or the CINR representing the signal quality of the target node TN' measured in the initiating node IN' like the triggering condition to form the link, and may also be defined based the predictive value of the RSSI or the CINR at the target node TN'. The triggering condition for the link deleting may also be defined by a receiving failure of the continuous control message from the target node TN'.

There may be at least one triggering condition for the link deleting and each triggering condition may be set to be satisfied by different environments, and when a plurality of triggering conditions are set, a process to form the link may be started when the plurality of triggering conditions are all satisfied.

Referring to FIG. 7, if the target node TN' in which the link is deleted is found from the control message of the target node TN' (S700-S702), the initiating node IN' starts the process to delete the link with the target node TN'.

The initiating node IN' transmits the link deleting request message LD-REQ to the target node TN' S704.

The target node TN' transmits the link deleting response message LD-RSP for the link deleting request message LD-REQ to the initiating node IN' S706, thereby informing the recognition of the link deleting.

The link deleting request message LD-REQ and the link deleting response message LD-RSP include a resource retain timer, and the resource retain timer measures a time that each node maintains information for a corresponding node. The resource retain time may be a predetermined value, or may be determined according to a path directed to a corresponding neighboring node.

That is, the initiating node IN' transmits the link deleting request message LD-REQ and starts the resource retain timer S708, and the target node TN' transmits the link deleting response message LD-RSP to the initiating node IN' and starts the resource retain timer 710.

If the initiating node IN' and the target node TN' respectively finish the resource retain time S712 and S714, the resource is released and the link formed between the initiating node IN' and the target node TN' is deleted S716 and S718.

Meanwhile, the initiating node IN' and the target node TN' must restore path for connections when data of the connection is transmitted to the corresponding node. This connection restoring process may be started when the link deleting is completed and may be completed before the resource retain time has ended. Also, the connection restoring process may be performed when the required QoS are not satisfied by the currently using path. In this case, connection restoring process may be started when the QoS failure is detected.

Figure 8:
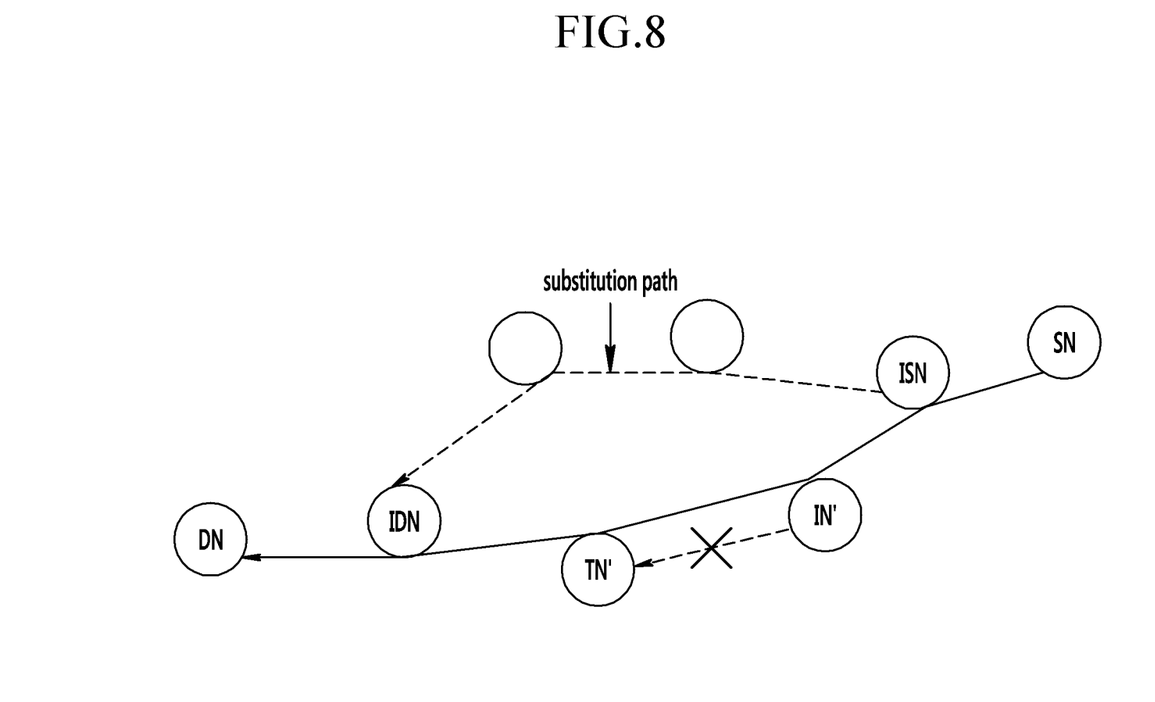
FIG. 8 is a view of one example to explain a connection restoring method of a mesh node according to an exemplary embodiment of the present invention.
Figure 9:
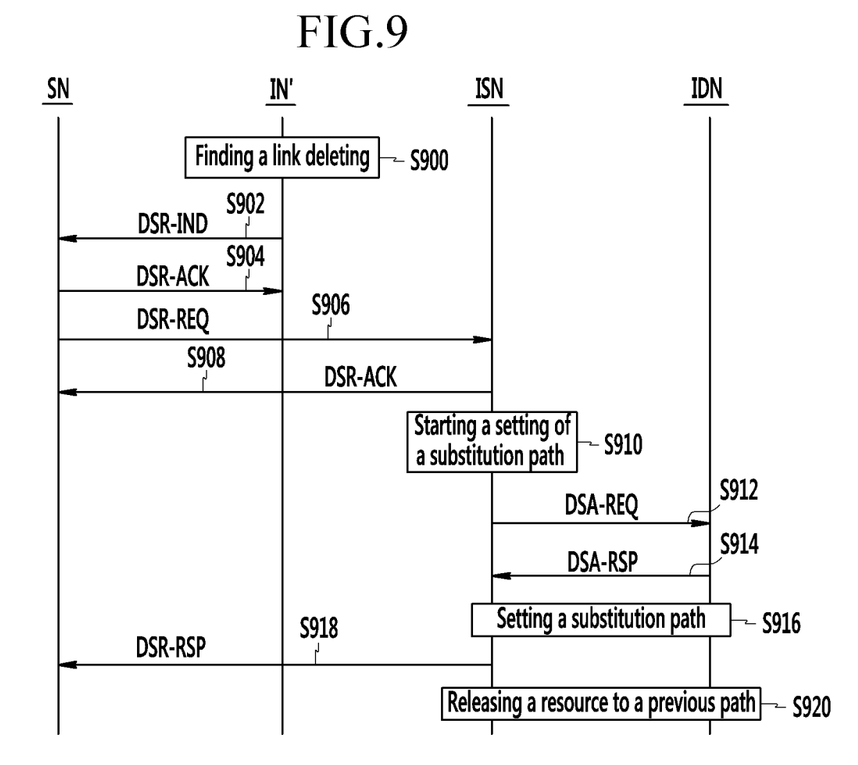
FIG. 9 is a flowchart showing the connection restoring method of FIG. 8.

FIG. 8 is a view of one example to explain a connection restoring method of a mesh node according to an exemplary embodiment of the present invention, and FIG. 9 is a flowchart showing the connection restoring method of FIG. 8.

Referring to FIG. 8, the connection restoring process may be started in the initiating node IN' in which the link to be deleted is found or the target node TN' of the link. The initiating node IN' or the target node TN' restores the connection using the deleted link to form an alternate path. At this time, when there are multiple connections using the corresponding link, the restoring process for each connection may be performed.

In FIG. 8, a source node SN represents a transmitting node of the connection using the deleted link, a destination node DN represents a reception node of the connection using the deleted link, an intermediate source node ISN is one of node in the connection before deleted link, and an intermediate destination node IDN is one of node in the connection after deleted link. In the original connection, the path between the intermediate source node ISN and the intermediate destination node IDN includes the initiating node IN' and the target node TN'.

To decrease the time for connection restoring process, the source node selects the intermediate source node ISN and the intermediate destination node IDN by using the path information. The paths between the source node SN and the intermediate source node ISN and between the intermediate destination node IDN and the destination node DN are not changed during the connection restoring process. The source node can set the intermediate source node ISN as the source node SN and the intermediate destination node IDN as the destination node DN.

Referring to FIG. 9, the initiating node IN' finds the deleted link S900, a connection restoring detecting message DSR-IND is transmitted to the source node SN of the corresponding connection S902. In FIG. 9, it is assumed that the connection restoring process is started in the initiating node IN'.

Note that the target node TN' can start the connection restoring process as well as the initiating node IN'.

The source node SN transmits a reception confirm message DSR-ACK for the connection restoring detecting message DSR-IND to the initiating node IN' S904. Also, the source node SN transmits a connection restoring request message DSR-REQ to the intermediate source node ISN S906, thereby requesting restoration of the path. At this time, the restoring may be requested for a portion of the entire path, and for this, the connection restoring request message DSR-REQ may include an identifier of the intermediate source node and the identifier of the intermediate destination node. If the connection restoring is started in the resource node SN, the process of transmitting the connection restoring request message DSR-REQ to the intermediate source node ISN may be omitted.

The intermediate source node ISN transmits the reception confirm message DSR-ACK for the connection restoring request message DSR-REQ to the source node SN S908, and then the substitution path setting is started S910. The substitution path setting process may be performed in the portion from the intermediate source node ISN to the intermediate destination node IDN, and if the entire path is restored, it is performed from the source node SN to the destination node DN.

The intermediate source node ISN transmits the connection request message DSA-REQ to the intermediate destination node IDN like the connection setting process S912, and receives the connection response message DSA-RSP for the connection request message DSA-REQ from the intermediate destination node IDN S914, thereby setting the substitution path S916.

The intermediate source node ISN increases a change count to the substitution path, thereby displaying a new path that is different from the existing path.

After setting the substitution path, the intermediate source node ISN transmits the connection restoring response message DSR-RSP for the connection restoring request message DSR-REQ to the source node SN S918.

Next, the intermediate source node ISN releases the previous path between the intermediate source node ISN and the intermediate destination node IDN S920. This release procedure can be done by exchanging the connection release request message DSD-REQ and connection release response message DSD-RSP. During the release procedure, the mesh nodes on the path can distinguish the previous path by using the change count.

Figure 10:
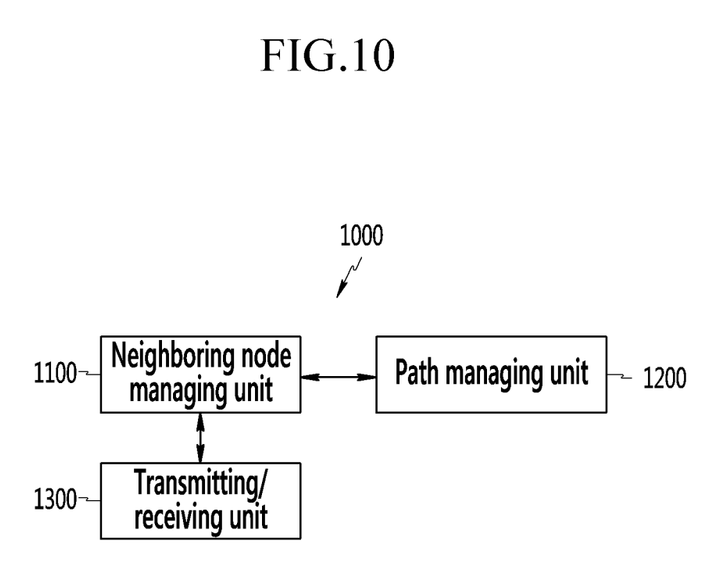
FIG. 10 is a block diagram of a wireless network managing apparatus of a mesh node according to an exemplary embodiment of the present invention.

FIG. 10 is a block diagram of a wireless network managing apparatus of a mesh node according to an exemplary embodiment of the present invention.

Referring to FIG. 10, the wireless network managing apparatus 1000 of the mesh node includes a neighboring node managing unit 1100, a path managing unit 1200, and a transmitting/receiving unit 1300.

The neighboring node managing unit 1100 recomposes the network while managing the neighboring node based on the control message and the data of the neighboring node transmitted from the transmitting/receiving unit 1300. In detail, if the neighboring node managing unit 1100 senses the entrance of the new neighboring node into its transmission range, the neighboring node managing unit 1100 selects an agent node having itself and the new neighboring node as neighboring node, and forms the link with the new neighboring node through the agent node. If the entrance of the new neighboring node in the transmission range is sensed, the neighboring node managing unit 1100 may form the link by setting the direct connection with the corresponding neighboring node.

If the neighboring node managing unit 1100 recognizes the neighboring node forming the link out of the transmission range, the link that was formed with the corresponding neighboring node is deleted. If the link is deleted, the neighboring node managing unit 1100 informs the deletion to the path managing unit 1200 for the path to be restored when the corresponding link is connected.

The path managing unit 1200 manages the connection information using the link to each neighboring node, and if the connection using the corresponding link exists when deleting the link, the restoring of the corresponding connection is performed to set the substitute path.

The transmitting/receiving unit 1130 transmits/receives the control message including broadcast message and the data with the neighboring node.

According to an exemplary embodiment of the present invention, in the wireless mesh network having mobility, managing of a neighboring mesh node is possible based on received signal intensity and a received message from the neighboring node.

In a link formation process with the neighboring mesh node, the agent node having two mesh nodes forms the link as the neighboring node functions as an authentication server, thereby reducing link formation time compared with a method of forming the link by using a central authentication server.

Also, in the link deleting process with the neighboring mesh node, when there is a connection using a fixed path for the quality of service (QoS), continuous QoS support is possible through the process of restoring the connection in the environment in which the mobility exists.

While this invention has been described in connection with what is presently considered to be practical exemplary embodiments, it is to be understood that the invention is not limited to the disclosed embodiments, but, to on the contrary, is intended to cover various modifications and equivalent arrangements included within the spirit and scope of the appended claims.

What is claimed is:

1. A wireless network managing method, comprising:
   sensing a target node within a transmission range of an initiating node;
   selecting an agent node corresponding to a neighboring node of the target node and the initiating node among nodes forming a link with the initiating node or the target node;
   forming a link between the initiating node and the target node through the agent node; and
   when the agent node does not exist, forming the link between the initiating node and the target node through a direct connection between the initiating node and the target node.

2. The wireless network managing method of claim 1, wherein
   the forming includes:
   transmitting a link formation request message to the target node through the agent node; and
   receiving a link formation response message for the link formation request message from the target node through the agent node,
   wherein the link formation response message includes information on whether the link formation is permitted.

3. The wireless network managing method of claim 2, wherein
   the link formation request message includes information on the initiating node, and the link formation response message includes information on the target node.

4. The wireless network managing method of claim 1, wherein
   the selecting includes:
   receiving neighboring node information on the neighboring node from the neighboring node.

5. The wireless network managing method of claim 1, wherein
   the sensing includes
   recognizing the target node based on quality information of the signal transmitted from the target node or predicted quality information at the target node.

6. The wireless network managing method of claim 5, wherein
   the quality information includes an RSSI (received signal strength indication) or a CINR (carrier-to-interference noise ratio).

7. The wireless network managing method of claim 1, further comprising:
   sensing an egress node that is out of the transmission range among a plurality of neighboring nodes forming the link with the initiating node; and
   deleting the link with the egress node.

8. The wireless network managing method of claim 7, wherein
   the deleting includes
   setting a substitution path for a connection when the connection including the deleted link exists.

9. The wireless network managing method of claim 8, wherein
   the setting of the substitution path includes
   changing an entire end-to-end path of the connection.

10. The wireless network managing method of claim 8, wherein
    the setting of the substitution path includes
    changing a portion of end-to-end path which including deleted link.

11. The wireless network managing method of claim 8, wherein
    the setting of the substitution path includes
    requesting connection restoration to a node initiating establishment of the substitution path through another node when changing the a portion of end-to-end path of the connection.

12. The wireless network managing method of claim 8, wherein
    the setting of the substitution path includes
    increasing a change count of the substitution path.

13. A wireless network managing apparatus, comprising:
    a neighboring node managing unit including process logic for managing a plurality of neighboring nodes positioned inside a transmission range of an initiating node based on a message transmitted from a plurality of neighboring nodes, if a target node newly enters into the transmission range, selecting an agent node corresponding to a neighboring node of the target node and the initiating node among nodes forming a link with the initiating node or the target node, forming a link between the initiating node and the target node through the agent node, and when the agent node does not exist, forming the link between the initiating node and the target node through a direct connection between the initiating node and the target node; and a transmitting/receiving unit receiving a message from a plurality of neighboring nodes and transmitting the message to the neighboring node managing unit.

14. The wireless network managing apparatus of claim 13, wherein the neighboring node managing unit requests link formation to the target node through the agent node and receives information on whether the link formation is permitted from the target node through the agent node.

15. The wireless network managing apparatus of claim 13, wherein the neighboring node managing unit transmits/receives information on the initiating node and information on the target node through the agent node.

16. The wireless network managing apparatus of claim 15, wherein the information on the initiating node includes authentication information on the initiating node, and the information on the target node includes authentication information on the target node.

17. The wireless network managing apparatus of claim 13, wherein the neighboring node managing unit senses an egress node that is out of the transmission range among a plurality of neighboring node, and deletes the link formed with the egress node.

18. The wireless network managing apparatus of claim 17, further comprising a path managing unit including process logic for managing a connection including the link to each neighboring node and restoring the connection including the link in a case of deleting the link.

19. The wireless network managing apparatus of claim 18, wherein the path managing unit sets a substitution path for the connection when the connection including the deleted link exist.

20. The wireless network managing apparatus of claim 19, wherein the substitution path is set by changing an entire or a portion of end-to-end path of the connection.

* * * * *